United States Patent
Gram et al.

(10) Patent No.: US 6,659,730 B2
(45) Date of Patent: Dec. 9, 2003

(54) HIGH PRESSURE PUMP SYSTEM FOR SUPPLYING A CRYOGENIC FLUID FROM A STORAGE TANK

(75) Inventors: Anker Gram, Vancouver (CA); Stephen Duncan Noble, West Vancouver (CA)

(73) Assignee: Westport Research Inc., Vancouver (CA)

(*) Notice: Subject to any disclaimer, the term of this patent is extended or adjusted under 35 U.S.C. 154(b) by 0 days.

(21) Appl. No.: 09/972,521

(22) Filed: Oct. 5, 2001

(65) Prior Publication Data

US 2002/0085921 A1 Jul. 4, 2002

Related U.S. Application Data

(63) Continuation-in-part of application No. 09/530,628, filed on May 2, 2000, which is a continuation of application No. 08/965,969, filed on Nov. 7, 1997, now Pat. No. 5,884,488.

(51) Int. Cl.[7] .............................................. F04B 15/08
(52) U.S. Cl. ......................... 417/53; 417/901; 62/50.6
(58) Field of Search ................. 417/440, 528, 417/527, 262, 261, 901, 259, 53; 62/50.6

(56) References Cited

U.S. PATENT DOCUMENTS

| | | | |
|---|---|---|---|
| 2,657,541 A | * 11/1953 | Schilling | 62/50.1 |
| 3,251,602 A | 5/1966 | Williams et al. | |
| 3,990,816 A | * 11/1976 | Kohler et al. | 417/901 |
| 4,239,460 A | 12/1980 | Golz | |
| 4,539,028 A | * 9/1985 | Paradowski et al. | 62/612 |
| 4,593,530 A | * 6/1986 | Longsworth | 417/901 |
| 5,127,230 A | 7/1992 | Neeser et al. | 62/7 |
| 5,163,409 A | 11/1992 | Gustafson et al. | |
| 5,209,647 A | 5/1993 | Bennitt | |
| 5,214,925 A | * 6/1993 | Hoy et al. | 62/50.6 |
| 5,243,821 A | * 9/1993 | Schuck et al. | 62/50.6 |
| 5,277,561 A | * 1/1994 | Dresler et al. | 417/901 |
| 5,360,139 A | 11/1994 | Goode | |
| 5,411,374 A | 5/1995 | Gram | |
| 5,477,690 A | 12/1995 | Gram | |
| 5,511,955 A | 4/1996 | Brown et al. | |
| 5,525,044 A | 6/1996 | Chen | |
| 5,533,492 A | 7/1996 | Willey et al. | |
| 5,545,015 A | 8/1996 | Scherrer | |
| 5,551,488 A | 9/1996 | Gram | |
| 5,566,712 A | 10/1996 | White et al. | |
| 5,575,626 A | 11/1996 | Brown et al. | 417/251 |
| 5,596,872 A | * 1/1997 | Payne | 60/468 |
| 5,807,078 A | 9/1998 | Chen | |
| 5,810,570 A | * 9/1998 | Nguyen | 417/901 |
| 5,884,488 A | 3/1999 | Gram et al. | 62/50.6 |
| 5,997,256 A | 12/1999 | Gunther | |
| 6,190,142 B1 | 2/2001 | Wu | |

FOREIGN PATENT DOCUMENTS

| | | | |
|---|---|---|---|
| DE | 43 28 264 | 3/1995 | |
| EP | 0 576 133 | 12/1993 | |
| EP | 0609473 | 8/1994 | 417/901 |
| EP | 0 743 451 | 5/1995 | |
| WO | PCT/CA98/01053 | 2/1999 | |
| WO | WO 99/10640 A1 * | 3/1999 | 417/901 |
| WO | WO 99/24714 | 5/1999 | |

* cited by examiner

Primary Examiner—Cheryl J. Tyler
(74) Attorney, Agent, or Firm—McAndrews, Held & Malloy, Ltd.

(57) ABSTRACT

A method and apparatus is provided for supplying both cryogenic liquid and vapor from a storage tank to a pump to reduce the need for venting. The pump is operable to pump cryogenic liquid or a mixture of liquid and vapor. Different operating modes are selectable to control mass flow rate through the pump. With one operating mode a high flow rate is achieved by supplying only cryogenic liquid to the pump. By selecting another operating mode, a lower mass flow rate is achieved by simultaneously supplying liquid and vapor from the storage tank to the pump. The pump preferably has an inducer with at least two chambers and valves for recycling excess fluid within the inducer instead of returning it to the storage tank. The reciprocating pump is preferably double acting such that fluid is discharged from the pump during both extension and retraction strokes.

38 Claims, 6 Drawing Sheets

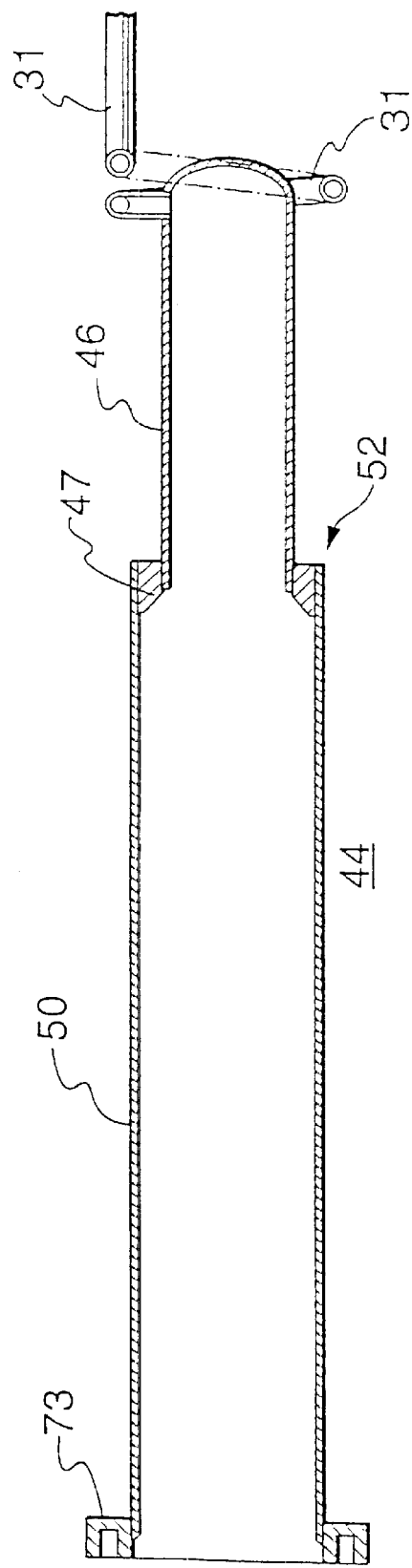

HIGH PRESSURE PUMP SYSTEM FOR SUPPLYING A CRYOGENIC FLUID FROM A STORAGE TANK

CROSS-REFERENCE TO RELATED APPLICATION(S)

This application is a continuation-in-part of U.S. patent application Ser. No. 09/530,628 filed May 2, 2000, entitled "High Pressure Fuel Supply System for Natural Gas Vehicles". The '628 application is a continuation and relates to and claims priority benefits from U.S. patent application Ser. No. 08/965,969 of the same title, now U.S. Pat. No. 5,884,488. The '628 application and the '969 patent are hereby incorporated by reference in their entirety.

FIELD OF THE INVENTION

This invention relates to medium and high pressure pump systems for supplying a cryogenic fluid from a storage tank and methods of operating such systems to remove both liquid and vapor from the storage tank to reduce the need for venting. A particularly advantageous application for the system and methods is for supplying a cryogenically stored fuel to an internal combustion engine.

BACKGROUND OF THE INVENTION

Natural gas has been used as a fuel for piston engine driven vehicles for over fifty years but the drive to improve efficiency and reduce pollution is causing continual change and improvements in the available technology. In the past, natural gas driven vehicles (NGV) were naturally fumigated, that is, natural gas was introduced into the cylinders through the intake manifold, mixed with the intake air and fed into the cylinders at relatively low pressure. The fuel supply system for such an NGV is relatively simple. Fuel is held in and supplied from a liquefied natural gas (LNG) vehicle tank with working pressure just above the engine inlet pressure, or from compressed natural gas cylinders (CNG) through regulators that reduce the pressure to the engine inlet pressure.

Compressed natural gas (CNG) is commonly stored at ambient temperatures at pressures up to 3600 pounds per square inch (24,925 kPa), and is unsuitable for trucks and buses due to the limited operating range and heavy weight of the CNG storage tanks.

On the other hand, liquefied natural gas (LNG) is normally stored at temperatures of between about −240° F. and −175° F. (about −150° C. and −115° C.) and at pressures of between about 15 and 200 psig (204 and 1477 kPa) in a cryogenic tank, providing an energy density of about four times that of CNG.

However, better efficiency and emissions can be achieved if the natural gas is injected directly into the cylinders under high pressure at the end of the compression stroke of the piston. This requires a fuel supply system that can deliver the natural gas at a pressure of 3000 pounds per square inch gauge (psig) and above. This makes it impossible to deliver the fuel directly from a conventional LNG vehicle tank and it is impractical and uneconomical to build an LNG tank with such a high operating pressure. Equally, it is impossible to deliver the natural gas fuel directly from a conventional CNG tank as the pressure in such a tank is lower than the injection pressure as soon as a small amount of fuel has been withdrawn from the CNG tank. In both cases, a booster pump is required to boost the pressure from storage pressure to injection pressure.

Liquid Natural Gas (LNG) Pump

High pressure cryogenic pumps have been on the market for many years, but it has proven difficult to adapt these pumps to the size and demand of a vehicle pump. In general, cryogenic pumps should have a positive suction pressure. It has therefore been common practice to place the pump directly in the liquid so that the head of the liquid will supply the desired pressure. The problem with this approach is that it introduces a large heat leak into the LNG storage tank and consequently reduces the holding time of the tank. The holding time is the time it takes for the pressure to reach relief valve set pressure.

Some manufacturers have placed the pump outside the storage tank and have reduced the required suction pressure by using a large first stage suction chamber. The excess LNG which is drawn into such a chamber, over that which can fill a second chamber, is returned to the LNG tank and again, additional heat is introduced into the LNG, which is undesirable.

Another problem with a pumped LNG supply is that it is difficult to remove vapor from the LNG storage tank. With low pressure gas supply systems, this is easily done. If the pressure in the LNG tank is high, fuel is supplied from the vapor phase thereby reducing the pressure. If pressure is low, fuel is supplied from the liquid phase. This characteristic of a low pressure system substantially lengthens the holding time, which is very desirable as mentioned above. Extending the holding time cannot be done with conventional LNG pump systems that draw from the liquid phase only and cannot remove vapor.

Gram U.S. Pat. No. 5,411,374, issued May 2, 1995, and its two divisional patents, U.S. Pat. No. 5,477,690, issued Dec. 26, 1995, and U.S. Pat. No. 5,551,488, issued Sep. 3, 1996, disclose embodiments of a cryogenic fluid pump system and method of pumping cryogenic fluid. The cryogenic fluid piston pump functions as a stationary dispensing pump, mobile vehicle fuel pump, and the like, and can pump vapor and liquid efficiently even at negative feed pressures, thus permitting pump location outside a liquid container. The piston inducts fluid by removing vapor from liquid in an inlet conduit faster than the liquid therein can vaporize by absorbing heat and causing pressure in the inlet conduit to be lowered. The differential pressure between the vapor pressure in the conduit and the vapor pressure within the tank pushes the liquid into the pump. The piston moves at essentially constant velocity throughout an induction stroke to generate an essentially steady state induction flow with negligible restriction of flow through an inlet port. The stroke displacement volume is at least two orders of magnitude greater than residual or dead volume remaining in cylinder during stroke changeover, and is greater than the volume of inlet conduit. As a fuel pump, the pump selectively receives cryogenic liquid and vapor from respective conduits communicating with the tank, and pumps cryogenic liquid to satisfy relatively heavy fuel demand of the engine, which, when satisfied, also pumps vapor to reduce vapor pressure in the tank while sometimes satisfying relatively lighter fuel demand.

Conventional, prior art cryogenic pumps are typically centrifugal pumps, which are placed either in the liquid inside the storage tank, or below the storage tank in a separate chamber with a large suction line leading from the tank, with both the pump and suction line being well insulated. Because a cryogenic liquid is at its boiling temperature when stored, heat leaked into the suction line and reduction in pressure will cause vapor to be formed. Thus, if the centrifugal pump is placed outside the tank, vapor is formed and the vapor will cause the pump to cavitate and the flow to stop. Consequently, prior art cryogenic pumps require a positive feed pressure to prevent or reduce the tendency to cavitation of the pump. In a stationary system, the positive feed pressure is typically attained by locating the pump several feet, for example, 5–10 feet (about 2–3 meters) below the lowest level of the liquid within the tank, and such installations are usually very costly. On board fuel storage systems for vehicles use other ways to provide positive feed pressure. Also, centrifugal pumps cannot easily generate high discharge pressures to properly inject fuel directly into the cylinder of an internal combustion engine and that are also desirable to reduce fuelling time for fuelling station applications.

Reciprocating piston pumps have been used for pumping LNG when high discharge pressures are required or desired, but such pumps also require a positive feed pressure to reduce efficiency losses that can arise with a relatively high speed piston pump. Prior art LNG piston pumps are crankshaft driven at between 200 and 500 RPM with relatively small displacements of approximately 10 cubic inches (164 cubic centimeters). Such pumps are commonly used for developing high pressures required for filling CNG cylinders and usually have a relatively low delivery capacity of up to about 5 gallons per minute (20 liters per minute). Such pumps are single acting, that is, they have a single chamber in which an induction stroke is followed by a discharge stroke, and thus the inlet flow will be stopped half of the time while the piston executes the discharge stroke. Furthermore, as the piston is driven by a crank shaft which produces quasi-simple harmonic motion, the piston has a velocity which changes constantly throughout its stroke, with 70% of the displacement of the piston taking place during the time of one-half of the cycle, that is, one-half of the stroke, and 30% of the piston displacement occurring in the remaining half cycle time. The variations in speed of the piston are repeated 200–500 times per minute, and generate corresponding pressure pulses in the inlet conduit, which cause the liquid to vaporize and condense rapidly. This results in zero inlet flow unless gravity or an inlet pressure above boiling pressure of the liquid forces the liquid into the pump. In addition, the relatively small displacement of these pumps results in relatively small inlet valves which, when opened, tend to unduly restrict flow through the valves. Thus, such pumps require a positive inlet or feed pressure of about 5 to 10 psig (135 to 170 kPa) at the feed or inlet of the reciprocating pump unless the inlet valve is submerged in the cryogenic liquid in which case the feed pressure can be reduced. Large cryogenic piston pumps, with a capacity of about 40 gallons per minute (150 liters per minute) have been built, but such pumps are designed for very high pressure delivery, require a positive feed pressure and are extremely costly.

SUMMARY OF THE INVENTION

A medium or high pressure pump system supplies a cryogenic fluid from a storage tank and a method of operating such a system. The system comprises a pump that is operable to pump cryogenic liquid or a mixture of cryogenic liquid and vapor, and the method comprises controlling mass flow rate by supplying to the pump from the storage tank, cryogenic liquid or a mixture of cryogenic vapor and liquid. More particularly, the method comprises:

(a) selecting a first operating mode in which cryogenic liquid from the storage tank is supplied to the pump to substantially fill a compression chamber with liquid to achieve a high mass flow rate; and (b) selecting a second operating mode to achieve a mass flow rate lower than the first operating mode by selectively supplying cryogenic liquid and vapor simultaneously to the pump from the storage tank wherein the vapor fraction is higher for the second operating mode compared to the vapor fraction for the first operating mode.

The pump system may comprise an inducer disposed between the storage tank and the pump compression chamber. The inducer precompresses the cryogenic fluid prior to introducing the fluid to the pump compression chamber(s). When the pump system is operating at maximum capacity by selecting the first operating mode, the inducer stages are defined as the stages in which substantially all of the cryogenic vapor is condensed, such that only cryogenic liquid is supplied to the pump compression chamber(s). Accordingly, when the pump system comprises an inducer, some vapor may be supplied to the system even when the first operating mode is selected. When the second operating mode is selected, some vapor is supplied to the compression chamber(s) where such vapor is condensed during the compression cycle, but with a consequent reduction in the flow rate through the pump system.

When the pump system does not comprise an inducer, and the first operating mode is selected, then only liquid is supplied from the storage tank so that the pump compression chamber is substantially filled with liquid to achieve a high mass flow rate. When the second operating mode is selected, cryogenic vapor and liquid are simultaneously supplied to the pump compression chamber with the vapor being condensed within the pump compression chamber during the compression cycle, but with the flow capacity through the pump being lower than the flow capacity through the pump when the first operating mode is selected.

Because it is advantageous to store some gaseous fuels under cryogenic conditions, the method may be employed to pump a cryogenically stored fuel to an internal combustion engine. To provide a steady supply of high pressure fuel to an engine the method may comprise delivering fuel from the pump to an accumulator vessel and selecting an operating mode to control mass flow rate to maintain pressure within a predetermined range within the accumulator vessel. The volume of the fuel conduits and manifolds between the pump and engine may be sized to have a volume such that these conduits and manifolds themselves act as the accumulator, obviating the need for an actual "vessel". The pressure may be monitored within the fuel conduit or manifold downstream from the pump, or within an accumulator vessel, if employed. The mass flow rate supplied by the pump system is controllable to maintain the monitored pressure within a predetermined range to ensure sufficient pressure for supplying the fuel to the desired application, such as an internal combustion engine. The method may further comprise increasing the vapor fraction supplied to the pump when vapor pressure within the storage tank is higher than a predetermined value or when the monitored pressure downstream from the pump is above a predetermined set point. That is, the vapor fraction can be increased to reduce vapor pressure in the storage tank to reduce or prevent the need for venting, or to continue operation of the pump system at a lower mass flow rate when pressure downstream of the pump is above a predetermined set point.

In a preferred arrangement for the pump, the inlet is associated with a first end of the pump and the outlet is associated with a second end, which is opposite to the first end. The heat of compression transferred to the cryogenic fluid during the compression process dissipates from the pump with the discharged fluid. With this preferred pump arrangement, the fluid passages within the pump are preferably arranged so that the cryogenic fluid flows through the pump progressively from the first end to the second end. In this arrangement, heat from the compression process is not transferred from the discharge fluid to the fluid being induced into the pump, as is the case with prior art pumps that have inlets proximate to outlets or discharge conduits proximate to induction conduits or chambers.

When the second operating mode is selected, the vapor fraction that is supplied to the pump is preferably maintained below a predetermined maximum vapor fraction by restricting the flow of vapor through a conduit between the tank and the pump. When the vapor fraction is too high, a reciprocating pump is unable to condense substantially all of the cryogenic vapor, and the pump will not operate efficiently. For specific operating conditions, maximum vapor fraction may be empirically determined or calculated to designate as the "maximum" vapor fraction, a vapor fraction that maximizes the amount of vapor that may be supplied to the pump while ensuring that substantially all of the vapor supplied to the pump during normal operation is condensable within the pump.

For example, in some systems an orifice may be employed for restricting the flow rate of vapor through the conduit between the tank and the pump. In other embodiments, the system may comprise a metering valve for controlling the flow rate through the vapor conduit between the tank and the pump. In such systems an electronic controller may be programmed to change the setting of the metering valve to control the amount of vapor that flows through the conduit in response to measured operating conditions, such as pressure measured downstream from the pump or vapor pressure measured in the storage tank.

When the first operating mode is selected, the method may further comprise closing a valve to prevent vapor from being supplied from an ullage space of the storage tank to the pump. "Ullage space" is defined herein as the vapor space within the storage tank. The valve is preferably an electronically controlled valve with an actuator, such as a solenoid, mechanical, pneumatic, or hydraulic actuation mechanism.

In a preferred method of operating the pump, it is driven at substantially a constant speed by employing a linear hydraulic motor. For example, the pump may be set to operable at a constant speed between 5 and 30 cycles per minute.

When the pump has been shut down for a period of time, it may be desirable to cool down the pump before it can begin to function properly. That is, if the temperature of the pump is too warm, cryogenic fluid introduced into the pump will immediately boil or vaporize, preventing the pump from being able to pump cryogenic fluid to higher pressures. A preferred cooling procedure for preparing the pump for operation comprises the following steps:
  (a) introducing cryogenic liquid from the tank into the pump;
  (b) returning vapor created within the pump to the tank, thereby increasing pressure within the tank; and
  (c) using the increased pressure within the tank to force more cryogenic liquid from the tank into the pump.

Once the pump has been cooled to the normal operating temperature, a valve controlling the flow of cryogenic fluid back from the pump to the storage tank is closed. That is, once the pump is cooled to predetermined temperature at which the pump is operable to pump the cryogenic liquid and vapor in one of the first or second operating modes, vapor is prevented from returning to the tank.

In a second preferred embodiment, the system comprises a multi-stage pump that has at least three chambers for compressing cryogenic fluid. A first chamber and a second chamber each have a volume that is larger than a third chamber. In this second embodiment, the first and second chambers act as an inducer stage with the third chamber acting as a compression chamber. For this second embodiment, the method comprises:
  selectively supplying a cryogenic liquid or a mixture of cryogenic liquid and vapor to the pump such that cryogenic fluid flows through an inlet into the first chamber;
  compressing and condensing cryogenic vapor and compressing cryogenic liquid within the first chamber and transferring cryogenic fluid from the first chamber to the second chamber;
  compressing cryogenic fluid within the second chamber and transferring the cryogenic fluid from the second chamber to the third chamber until the third chamber is filled, and then transferring cryogenic fluid remaining within the second chamber to the first chamber; and
  compressing cryogenic fluid within the third chamber and discharging compressed cryogenic fluid from the third chamber through an outlet port.

In this second embodiment of the method, when a first operating mode is selected and the flow rate through the pump is maximized, the cryogenic fluid is being compressed within the second chamber and by the end of the compression stroke, substantially all of the gas or vapor that was within the second chamber at the beginning of the compression stroke has been condensed, such that substantially all of the fluid that is transferred to the third chamber is cryogenic liquid. When a second operating mode is selected and the pump operates at a lower flow rate some vapor may be transferred from the second chamber to the third chamber with the pump then operating with a reduced flow capacity.

In this second embodiment, excess cryogenic fluid induced into the pump is advantageously recycled from the second chamber to the first chamber, so that no vapor is returned from the pump to the storage tank during normal operation. This is an advantage over known systems that return excess cryogenic fluid to the storage tank since such systems introduce heat into the storage tank with the return of the excess fluid.

The method may further comprise employing a pressure actuated relief valve for controlling the return of cryogenic fluid from the second chamber to the first chamber.

The method may further comprise supplying the fluid from the pump to an accumulator and selectively introducing only cryogenic liquid to the pump when pressure within the accumulator decreases below a predetermined value. The accumulator may be an actual pressure vessel or the fluid conduits and manifolds themselves, which collectively provide an accumulator volume.

When the pump comprises at least three chambers for compressing cryogenic fluid and a reciprocating piston assembly divides the three chambers, in a preferred method the pump operates in the following manner:
  (a) during a retraction stroke, retracting a piston, and thereby,
    increasing the volume of a first chamber of the pump and selectively introducing into the first chamber, a cryogenic liquid or a mixture of cryogenic vapor and liquid supplied from the storage tank;
    decreasing the volume of a second chamber of the pump, compressing cryogenic fluid within the second chamber, transferring cryogenic fluid from the second chamber into a third chamber until the third chamber is filled, and then returning cryogenic fluid from the second chamber to the first chamber until the retraction stroke is completed;

increasing the volume of a third chamber of the pump and receiving cryogenic fluid from the second chamber into the third chamber until the third chamber is full; and (b) during an extension stroke, extending the piston, and thereby, decreasing the volume of the first chamber, compressing cryogenic fluid within the first chamber, and transferring cryogenic fluid within the first chamber to the second chamber;

increasing the volume of the second chamber and drawing fluid into the second chamber from the first chamber;

decreasing the volume of the third chamber, compressing fluid within the third chamber, and ejecting cryogenic fluid through an outlet from the third chamber.

At the end of the extension stroke, the volume of the second chamber is preferably between about four and ten times larger than the volume of the third chamber when the piston is at the end of the retraction stroke. Further, the volume of the first chamber at the end of the retraction stroke is preferably larger or substantially equal to the volume of the second chamber at the end of the extension stroke. With this arrangement, the first chamber has sufficient volume to accept substantially all of the excess cryogenic fluid that may be recycled from the second chamber to the first chamber. In a preferred configuration of the pump, at the end of the extension stroke, the volume of the third chamber is substantially zero.

In a third preferred method of operating a reciprocating pump for pumping a cryogenic fluid from a sump of a cryogenic storage tank, the pump comprises at least two chambers divided by a reciprocating piston assembly. This method comprises the following steps:

(a) during a retraction stroke, increasing the volume of a first compression chamber of the pump and introducing into the first compression chamber a cryogenic fluid supplied from the storage tank;

decreasing the volume of a second compression chamber of the pump and thereby compressing fluid within the second compression chamber and ejecting compressed fluid from the second compression chamber and out of the pump; and (b) during an extension stroke, decreasing the volume of the first compression chamber and transferring fluid within the first compression chamber to the second compression chamber;

increasing the volume of the second compression chamber and drawing cryogenic fluid into the second compression chamber from the first compression chamber, wherein the volume of the second compression chamber at the end of the extension stroke is less than the volume of the first compression chamber at the end of the retraction stroke so that when the volume of the second compression chamber is filled by fluid flowing into the second compression chamber from the first compression chamber, the remainder fluid is ejected from the second compression chamber and out of the pump.

In this embodiment, the volume of the second compression chamber at the end of the extension stroke is about half or less than half of the volume of the first compression chamber at the end of the retraction stroke. Preferably, the relative sizes of the first and second compression chambers are such that about an equal amount of fluid is discharged during the retraction and extension strokes.

The method may further comprise condensing cryogenic vapor in an inducer stage prior to introducing the cryogenic fluid into the first compression chamber.

The preferred system for pumping a cryogenic fluid from a storage tank comprises:

(a) a reciprocating pump comprising a suction inlet and a discharge outlet;

(b) a first pipe fluidly connecting the suction inlet to liquid within the interior of the storage tank;

(c) a second pipe fluidly connecting the suction inlet to vapor within the storage tank; and (d) a restriction in the second pipe for limiting flow through the second pipe so that a mixture of liquid and vapor may be supplied from the storage tank to the suction inlet.

The restriction may be made, for example, by an orifice, a narrowing of the second pipe, or a metering valve. The restriction is preferably sized to maintain a vapor fraction supplied to the pump that is equal to or less than a predetermined maximum vapor fraction.

An advantage of one embodiment of the pump is that the pump may comprise a cold end disposed within a sump and a warm end opposite to the cold end, wherein the suction inlet is associated with the cold end and the discharge outlet is associated with the warm end. This arrangement prevents heat generated from the compression process from being transferred from the discharged cryogenic fluid to the cryogenic fluid being induced into the pump from the sump.

The system preferably further comprises a linear hydraulic drive connected to a piston of the pump. The linear hydraulic drive permits the piston to be drivable at a constant speed, which helps to reduce the creation of pressure pulses in the discharge pipe. In another embodiment, the pump speed may be changed to provide an additional means for influence the mass flow rate through the system to provide a greater range of selectable flow rates. However, this requires additional controls and apparatus for varying the speed of the hydraulic drive and the pump. The pump is preferably operable by the linear hydraulic drive at a fixed speed or at variable speeds, between 5 and 30 cycles per minute.

BRIEF DESCRIPTION OF THE DRAWINGS

The drawings illustrate specific embodiments of the invention, but should not be construed as restricting the scope of the invention:

FIG. 6 illustrates a section view of a sump when the LNG pump is withdrawn.

DETAILED DESCRIPTION OF PREFERRED EMBODIMENT(S)

Natural gas burning engines can be broadly classified into two classes, namely those having a low pressure fuel system and those having a high pressure fuel system. A low pressure fuel system is defined as a fuel system of an engine that operates on a fuel pressure that is lower than the minimum operating pressure of the tank. In this type of low pressure system, no fuel pump is required and the tank has a vapor conduit that removes vapor from the tank, and a liquid conduit that removes liquid from the tank. Each conduit is controlled by a respective valve, which in turn is controlled by at least one pressure sensor. The engine normally receives fuel through the liquid conduit, except in instances where tank pressure exceeds a specified pressure, for example, about 60 psig (516 kPa), in which case the vapor conduit is opened, so as to release some vapor to the engine, which reduces pressure in the tank, thus enabling longer holding times. This is a simple system that ensures that tank pressure is kept low by taking fuel in the vapor phase from the tank whenever pressure in the tank is over the specified pressure level.

In contrast, a high pressure fuel system requires a fuel pump that supplies fuel at a pressure of about 3,000 psig (20,771 kPa), depending on fuel system parameters. This is usually accomplished by a small displacement piston pump located inside the vehicle tank with a submerged inlet to ensure a positive feed pressure. Such installation is difficult to install and service, and makes the fuel tank and pump assembly relatively large. Because the pump can only pump liquid, vapor generated by heat leak and working of the pump will decrease the holding time of the tank by a substantial amount, and result in high fuel loss because the vapor should be vented prior to refueling the tank. This venting of vapor reduces effective capacity of the vehicle tanks still further, compounding the difficulty of use of LNG in a vehicle tank. It is believed that no single pump can efficiently pump both liquid and vapor, or a mixture of both, and thus a system that can remove and burn vapor in the engine is not available for high pressure fuel systems. Also, conventional piston pumps require a net positive pressure at the inlet port, which severely limits location of such pumps, and in particular such pumps cannot be used with a vehicle tank having a conventional "over the top" liquid outlet. Many problems would be solved if a vehicle pump could be developed which could operate with a negative suction pressure, which would permit the vehicle pump to be located outside the vehicle tank and placed wherever space is available in the vehicle.

Figure 1:
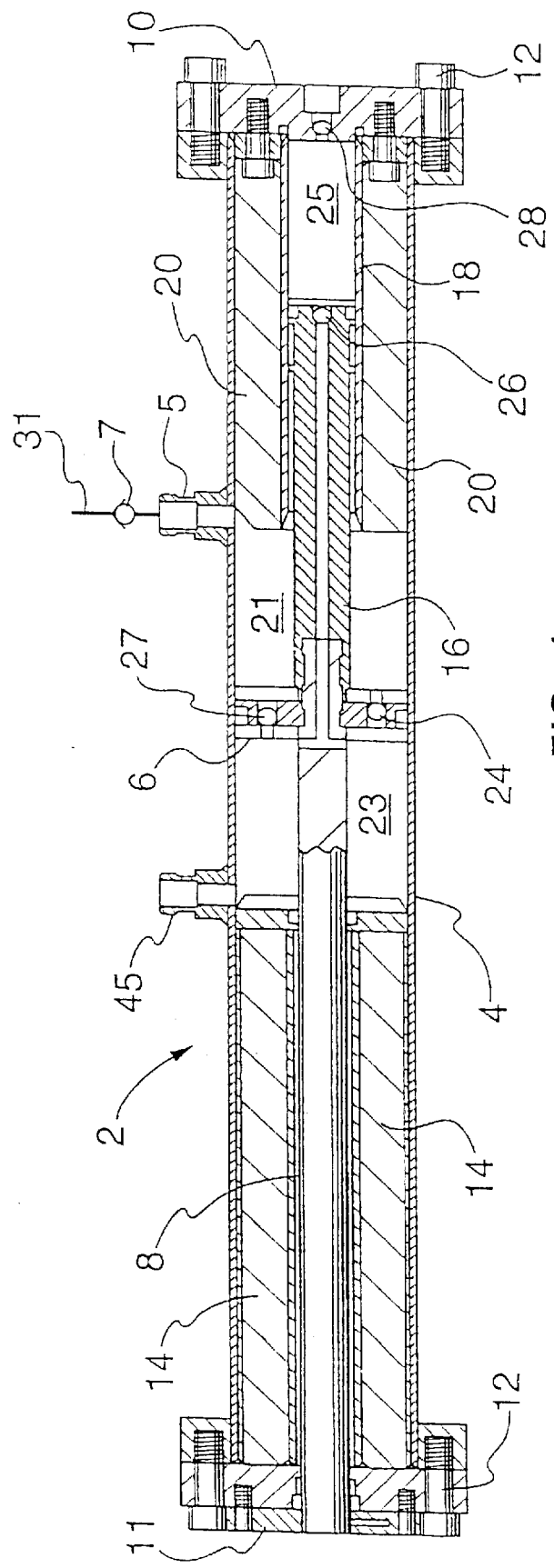
FIG. 1 illustrates a sectional view of an LNG pump assembly that is operable according to a preferred embodiment of the present method. The pump assembly comprises three chambers for compressing cryogenic fluid.
Figure 2:
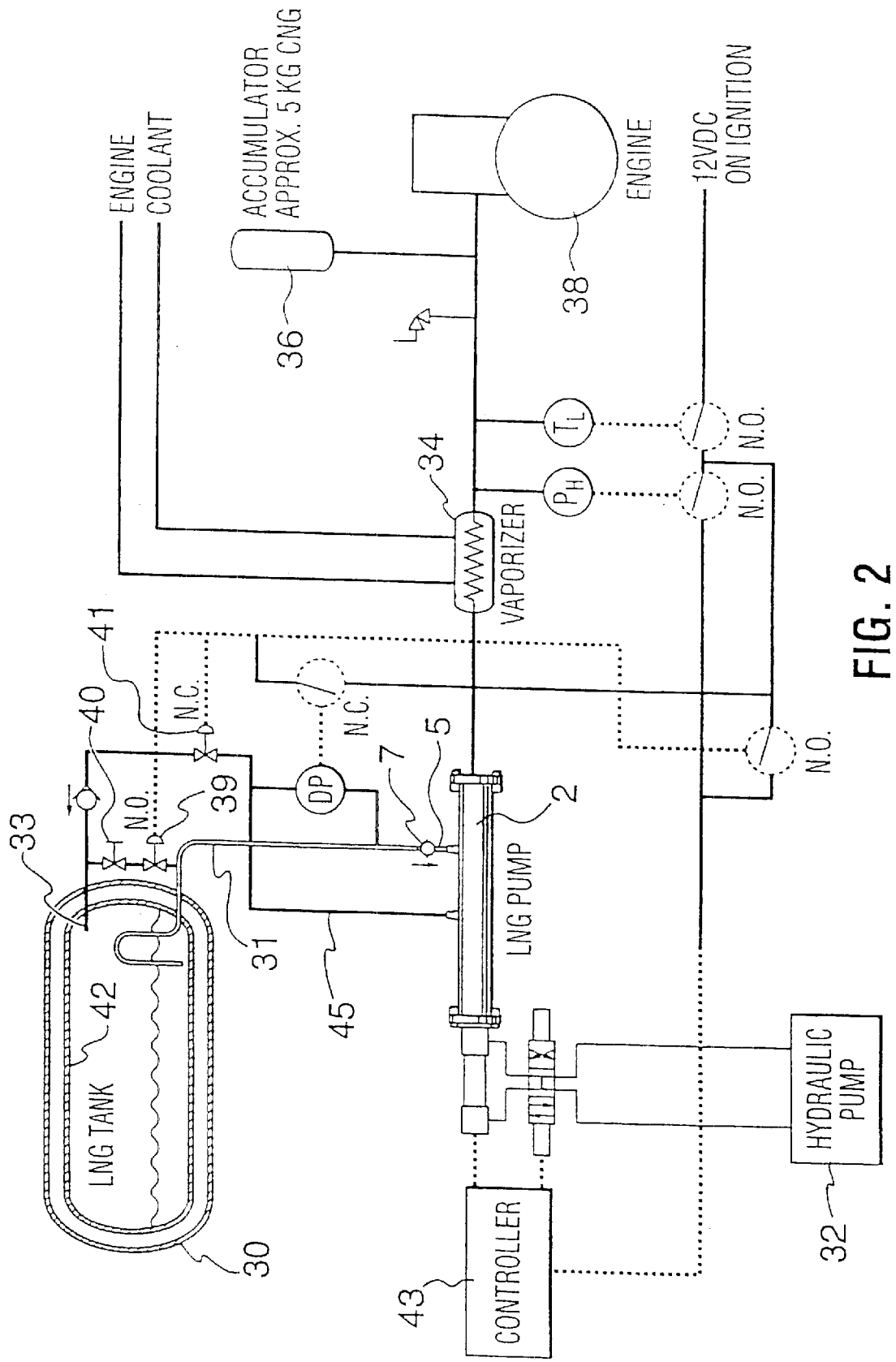
FIG. 2 illustrates a schematic flow diagram of an LNG supply system for supplying fuel to an engine according a preferred method, where the LNG pump is external to the LNG tank.

Referring to FIGS. 1 and 2, which show respectively a section view of an LNG pump assembly according to a preferred embodiment of the present system, and a schematic flow diagram of an LNG supply system to an engine according to a preferred embodiment of the present system, where the LNG pump is external to the LNG tank, FIG. 1 illustrates cylindrically shaped pump 2 which holds inside cylinder 4 reciprocating piston 6 which is driven by cylindrical shaft 8 that is connected to an external driving force. The ends of the cylinder are capped with heads 10 and 11 and bolts 12. Teflon® or similar thermal insulation 14 such as UHMW (a well-known but less expensive cryogenic insulation compared to Teflon®) encloses shaft 8 and reduces heat loss. The end of piston 6, opposite shaft 8, has hollow cylindrical rod 16, which reciprocates inside sleeve 18, which is also insulated with thermal insulation 20 such as Teflon or a similar material. This configuration forms chambers 21, 23 and 25. Check valves 24 and 27 are located within piston 6, check valve 26 is located within shaft 16 and check valve 28 is preferably located within head 10. One-way check valve 7 is also located in association with inlet 5. While not illustrated in FIG. 1, the exterior of pump 2 is also insulated to prevent heat transfer into the pump. Lines leading to and from the pump are also insulated, as is conventional in the art.

The first main chamber comprising first and second chambers 21 and 23 separated by piston 6 is between about four and ten times larger than third chamber 25. In one embodiment, first and second chambers 21 and 23 are preferably about 5 times larger than third chamber 25. When piston 6 retracts to the left, natural gas liquid and vapor is drawn into first chamber 21 of cylinder 4 through inlet 5 and check valve 7, which is located outside cylinder 4. When piston 6 extends to the right, the mixture of liquid and vapor in first chamber 21 is moved into second chamber 23 through check valve 24. When piston 6 retracts again to the left, the liquid and vapor mixture in second chamber 23 is compressed and forced into third chamber 25 through the passage in hollow piston rod 16 and check valve 26.

The mixture of liquid and vapor in first chamber 21 is at a saturation pressure and temperature during the retracting suction stroke as piston 6 moves to the left. When this mixture is compressed in second chamber 23 on the second retraction stroke, the vapor condenses, the total volume is reduced and the liquid is then pushed into third chamber 25 through the passage in hollow rod 16 and check valve 26. If too much liquid is initially drawn into second chamber 23, relief valve 27 will open at a given pressure and let the excess fluid move back into first chamber 21, thereby returning no liquid to LNG storage tank assembly 30 under normal operating conditions.

FIG. 2 illustrates a schematic flow diagram of an LNG supply system to an engine according to a preferred embodiment of the present system, in which the LNG pump is external to LNG tank assembly 30. FIG. 2 illustrates LNG tank assembly 30, hydraulic pump 32 that drives LNG pump 2, vaporizer 34, accumulator 36 and engine 38. The volume in the fuel conduits between pump 2 and engine 38 may be sized so that the fuel conduits themselves act as accumulator 36 and an actual accumulator vessel is not required. LNG tank assembly 30 has inner tank 42, and a vacuum between the outer tank and inner tank 42, for insulation. With reference to pump 2 of FIG. 1, the liquid that enters third chamber 25 through check valve 26 is compressed to the required high pressure when piston 6 extends to the right. It will then be ejected from third chamber 25 through check valve 28 to flow through vaporizer 34, where the liquid is converted to gas, and into accumulator 36 as compressed natural gas. The compressed natural gas held in accumulator 36 can be maintained at a pressure sufficient for injecting the natural gas through injection valves directly into the combustion chambers of engine 38.

In normal operation, pump 2 will draw a mixture of vapor and liquid from LNG tank assembly 30. Suction line 31 is connected not only to the bottom portion of inner tank 42, where the end of line 31 opens below the level of the liquid therein, but also to the upper portion of inner tank 42, for drawing vapor through line 33 that opens above the level of the liquid within inner tank 42. Flow of vapor through suction line 31 is controlled by solenoid valve 39 and metering valve 40. During normal operation, solenoid valve 39 will be open and the amount of vapor drawn into line 31 depends on the setting of metering valve 40.

The vapor fraction of the mixture of cryogenic liquid and vapor is defined as the volume of vapor that is supplied to the cryogenic pump divided by the total volume of cryogenic fluid supplied to the cryogenic pump. Through experimentation it has been determined that, depending upon the particular operating conditions, a minimum amount of liquid that should be supplied to the pump to ensure that substantially all of the vapor can be condensed. Accordingly, for efficient operation of the pump, the maximum vapor fraction is achievable by supplying the minimum amount of liquid to condense the vapor within the pump. When the vapor fraction is higher than this maximum vapor fraction, the efficiency of the pump is reduced.

In the arrangement illustrated in FIG. 2, metering valve 40 may be a manual valve that is set to maintain a vapor fraction that is equal to or less than the maximum vapor fraction determined for most operating conditions. Metering valve 40 may also be electronically controlled to allow the vapor fraction to be changed in response to different operating conditions so that the vapor fraction is always equal to or less than the maximum vapor fraction for the current operating conditions.

The saturated vapor that is removed from LNG tank assembly 30 will be compressed and condensed in second chamber 23 and further compressed in third chamber 25 of LNG pump 2, as explained above in relation to FIG. 1, to the desired gas pressure in accumulator 36.

When solenoid valve 39 is open, the capacity of pump 2 will be reduced. However, should the pressure downstream from pump 2 get too low, that is, too close to the engine injection pressure because engine 38 requires more fuel, programmed computer controls in controller 43 will close solenoid valve 39 and only LNG from the bottom of tank assembly 30 will flow into pump 2 thereby ensuring that the maximum fuel capacity of LNG pump 2 is achieved.

FIG. 2 shows pump 2 located outside LNG tank assembly 30. If pump 2 is located outside tank assembly 30, the exterior of the pump is well insulated with conventional insulation material and heat leakage back into LNG tank assembly 30 is prevented because no flow of the fuel into LNG tank assembly 30 is possible. Also, the interior of pump 2 is well insulated by insulation 14 and 20. But even so, if vehicle engine 38 has not been operated for an extended time, such as when the vehicle is parked, pump 2 may have warmed up relative to the temperature of the liquid in LNG tank assembly 30. This residual heat in pump 2 would cause LNG drawn into pump 2 to boil and thereby greatly reduce the capacity of pump 2.

To reduce the cool down time of pump 2, when it again begins operation, the programmed controls may open second solenoid valve 41. Opening of valve 41 enables the vapor created by warm pump 2 to be pumped from second chamber 23 through gas line 45 and line 33 into the upper vapor space of inner tank 42, thereby increasing the pressure in inner tank 42, and thereby forcing more liquid from the bottom of inner tank 42 into pump 2, which will then in turn be cooled down faster than would be the case if solenoid 41 is not opened.

In other embodiments, such as those illustrated in FIGS. 3 through 6, the LNG pump may be located in sump space 44 inside the vacuum space between the outer tank and inner tank 42 of LNG tank assembly 30. In the embodiment shown in FIG. 3, greater efficiency and reduced heat leak is gained by locating the cold end of pump 48 in the vacuum space of LNG tank assembly 30. However, to do so, several unique features should be incorporated into a pump designed for this purpose. Also, sump space 44 should be built into the outer tank.

As explained before, a vacuum between the outer tank and inner tank 42 insulates LNG tank assembly 30. For maintenance purposes, pump 48 should be removable from sump space 44 without disturbing the high vacuum that thermally insulates tank assembly 30. This can be done by permanently connecting liquid suction line 31 from inner tank 42 to small sump 46 which is located in sump space 44 in the enlargement in the outer tank of tank assembly 30, and installing the cold end of pump 48 in sump 46 with pressure seal 47 located so that only the portion of pump 48 within sump 46 is surrounded with LNG. Pump 48 can be removed only when inner tank 42 is empty of LNG. Otherwise, LNG would flow through line 31. The configuration of a built-in pump has the added advantage that no pump cool down procedure is required during start-up. LNG runs freely through line 31 into sump 46 as soon as pumping is started and when pumping is stopped for an extended time, the LNG in line 31 and sump 46 will be pushed back into inner tank 42 by vapor pressure thereby reducing the heat loss.

It is usually highly desirable for efficiency to have a double acting pump, because then the pump is working in both directions. But a conventional double acting pump typically has inlet and outlet valves at either end, which makes such a design unsuitable as a built-in pump. It is difficult to remove pump 48 unless sump 46 is very large. The unique features of the pumps illustrated in FIGS. 3 through 5 where the exhaust valve is piped to the exterior end have avoided this difficulty.

Figure 3:
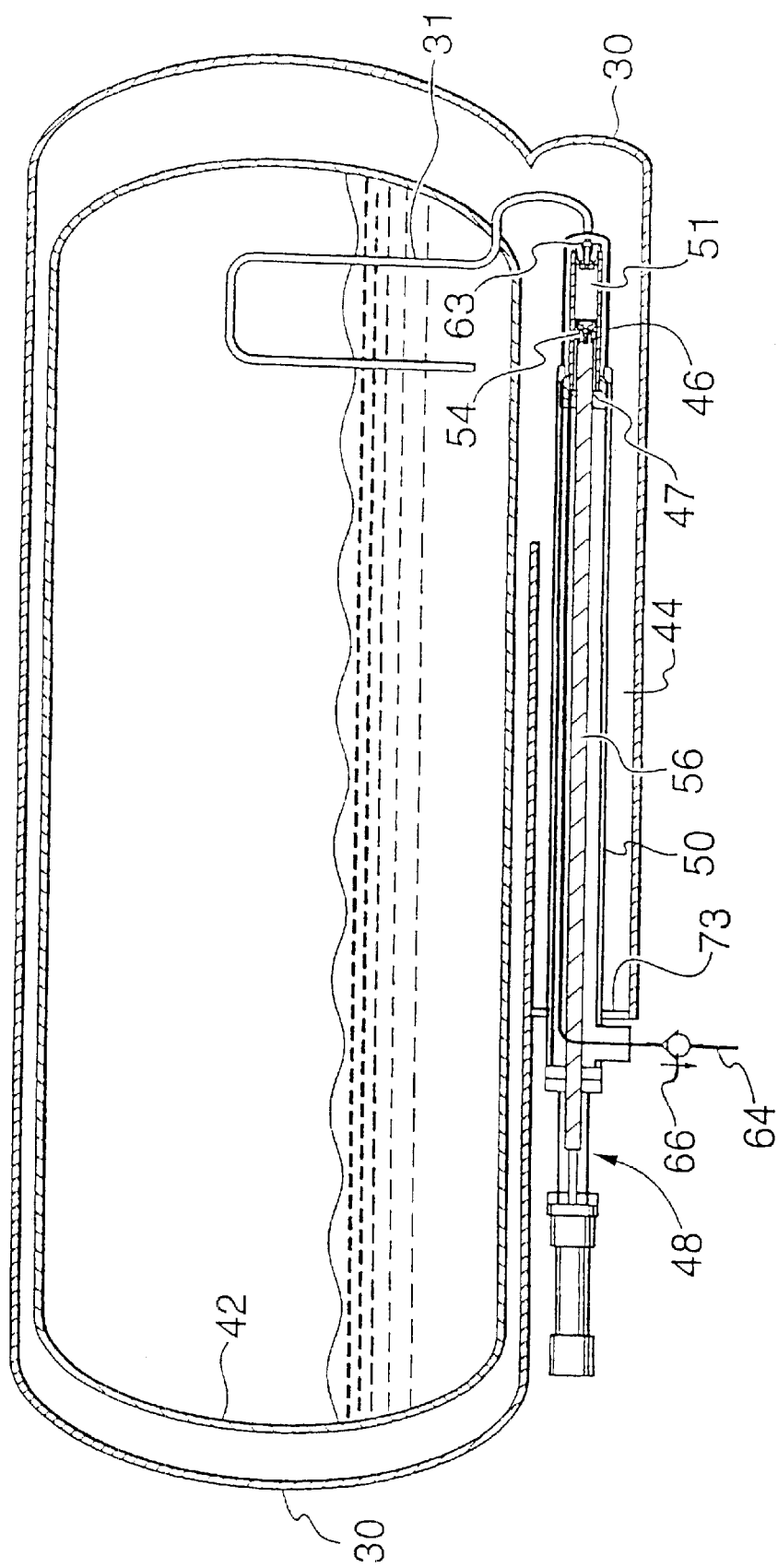
FIG. 3 illustrates a section view of another preferred embodiment of a system that is operable according to a preferred embodiment of the present method, where the LNG pump is built into a sump in a storage tank for cryogenic fluids.
Figure 4:
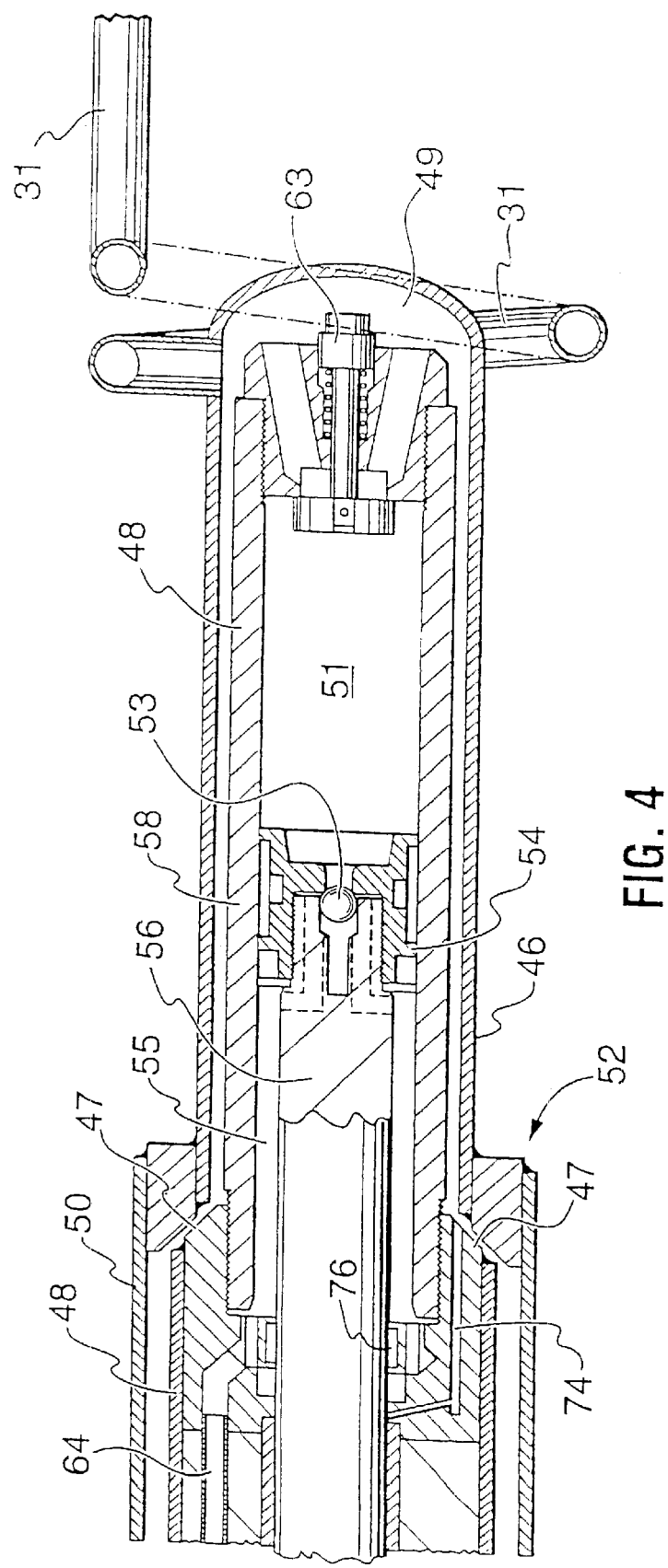
FIG. 4 illustrates a detailed enlarged section view of the embodiment of FIG. 3, with the LNG pump built into the sump of a storage tank for cryogenic fluids. This embodiment of the LNG pump comprises two chambers for compressing cryogenic fluid and an inlet associated with the cold end that is inserted into a sump and an outlet associated with the opposite end of the LNG pump.

Another advantage of this configuration illustrated in FIGS. 3 and 4 is that it allows check valve 63 to be larger, compared to known reciprocating pumps, which have an inlet and an outlet associated with the same end. With a configuration like the one illustrated in FIGS. 3 and 4, the cold end of pump 48 need not also accommodate space for an outlet. This allows essentially the entire cold end area of pump 48 to be available for accommodating check valve 63. Employing a larger check valve at the pump inlet reduces entrance losses and enables pump 48 to operate with a lower net positive suction head (NPSH). NPSH for cryogenic pumps is defined herein to mean, for a given fluid temperature, the difference between boiling pressure and the actual pressure. The same advantages are realized with the configuration of pump 148 shown in FIG. 5. The same advantages are realized with the configuration of pump 149 shown in FIG. 5.

Figure 5:
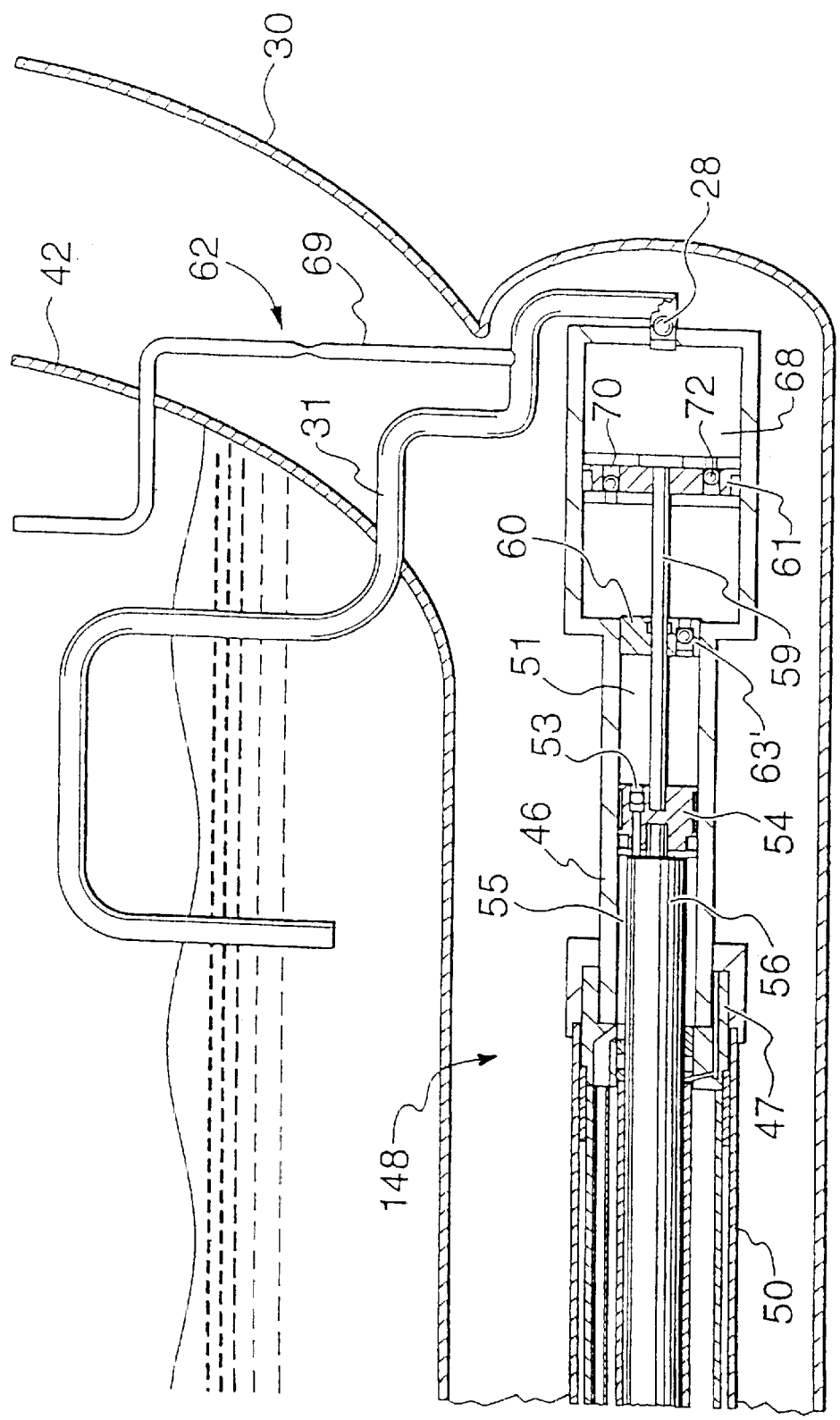
FIG. 5 illustrates a detailed enlarged section view of a yet another embodiment of a system operable according to a preferred embodiment of the present method; this system includes an LNG pump built into the LNG tank in association with an inducer.

Yet another advantage of the pump configurations shown in FIGS. 3 through 5 is that the pump outlet is associated with the end of the pump that is opposite to the cold end, where the inlet is located. Cryogenic fluid, after being compressed, may have increased in temperature and it is desirable to keep the discharge conduits away from the inlet where heat transfer might cause additional vaporization of the fluid being induced through the pump inlet.

FIG. 4 illustrates a detailed enlarged section view of the second embodiment of the present system, in which LNG pump 48 is built into LNG tank assembly 30. FIG. 4 illustrates suction line 31 in looped configuration to thereby provide a gas trap, as is common in the cryogenic and LNG art. Pump 48 is held in place against seal 47 formed in the end of sump 46 by bolts or some similar holding mechanism. Pump 48 can be separated from seal 47 and withdrawn by removing the securing bolts. The LNG from inner tank 42 (see FIG. 3) flows through suction line 31 into space 49 between sump 46 and the outer shell of pump 48. The vacuum within sump space 44 (see FIG. 3) is maintained by sump space 44 being sealed by the exterior of sump 46 and sleeve 50. Pump 48 can be withdrawn from the interior of sleeve 50 without disturbing the vacuum in space 44 (see FIG. 6). Sump 46 is sealed to sleeve 50 at junction 52.

Built-in pump 48 operates in the following manner. When piston 54 retracts to the left, LNG is drawn through line 31 into first chamber 51 through check valve 63. When piston 54 extends to the right, the LNG is pushed through check valve 53 located in piston 54 and into chamber space 55 between cylinder 58 and piston rod 56. The diameter of piston rod 56 is sized so the volume of chamber space 55 is about half the volume of first chamber 51. Therefore, half the volume of the liquid in chamber 51 will flow to chamber 55 and the remainder will be pushed out to the left through outlet line 64 and one-way check valve 66 (see FIG. 3). The pressure in chambers 51 and 55 will become equal to the discharge pressure as soon as piston 54 starts extending to the right.

When piston 54 retracts to the left again, more LNG will be drawn through line 31 into chamber 51 while at the same time the previously transferred LNG in chamber 55 will be discharged out through outlet line 64. In other words, on each piston stroke, in either direction, about an equal amount of LNG is discharged. This is an advantage for smooth pump operation. It is also a significant advantage of this pump design that the one-way check valve (see check valve 66 in FIG. 3) can be located outside pump 48 on outlet line 64, where it is accessible and easy to maintain. FIG. 4 also illustrates passageway 74, which enables liquid that escapes past shaft seal 76 to return to sump 46.

The pump shown in FIG. 4 will pump LNG to high pressure without inducing heat into storage tank assembly 30, but if operating conditions are such that a longer holding time is demanded, an inducer feature similar to that shown in FIGS. 1 and 2 can be added. FIG. 5 illustrates a detailed enlarged section view of a third embodiment of the present system, which features an LNG pump built into the LNG tank in association with an inducer. It will be understood that FIG. 5 is illustrative only and would not be built precisely as shown. The narrow left end of sump 46 would have to be layered in order to enable the inducer of pump 148 to be withdrawn.

In the embodiment illustrated in FIG. 5, induction chamber 68 is attached to the inlet end of pump 148 thereby combining the some of the novel features of pump 2 and pump 48. The volume of induction chamber 68 is on the order of four times larger than chamber 51, that is, the diameter of chamber 68 is twice that of chamber 51. A smaller piston rod 59 is extended through the first bottom plug 60 and another piston 61 is attached to the end of rod 59. This piston 61 has a pair of opposing check valves 70 and 72, which act the same way as check valves 24 and 27 in pump 2 illustrated in FIGS. 1 and 2. Tube 69 connects the vapor space of tank 42 to main suction line 31. Vapor is fed through restricting orifice 62. This restricting orifice 62 acts the same way as metering valve 41 acts on pump 2 that is illustrated in FIG. 2. As before, the embodiment shown in FIG. 5, by drawing vapor as well as liquid from inner tank 42, can greatly increase the holding time before boil off venting occurs. The optimum size for restriction of restriction 62 can be determined by employing an adjustable orifice. As previously disclosed, it is preferable to maintain a vapor fraction that is equal to or less than the maximum vapor fraction that allows condensation of substantially all of the vapor within the pump. Depending upon the scale of the system, restriction 62 can be sized to maintain a vapor fraction equal to or less than the maximum vapor fraction during normal operating conditions.

As an alternative embodiment, induction chamber 68 illustrated in FIG. 5 can be eliminated if the ratio between first chamber 51 and second chamber 55 is increased to more than 2:1. In that case, main suction line 31 and tube 69, with restriction 62, can be connected to sump 46 for inducing cryogenic fluid from sump 46 directly into first chamber 51.

FIG. 6 illustrates a detail of sump 46 and sleeve 50 when LNG pump 48 has been separated from the LNG tank. After pump 48 has been withdrawn, sump 46, with looped inlet 31, and sleeve 50, still remain in place within sump space 44 to preserve the vacuum between the outer tank and inner tank 42 of LNG tank assembly 30. The end of sleeve 50 opposite sump 46 is sealed to the outer tank (not shown, but see FIG. 3) at seal 73. Pressure seal 47, against which pump 48 bears, when installed inside sleeve 50 and sump 46, is also shown in FIG. 6.

LNG pumps 2, 48 and 148 illustrated in FIGS. 1 to 6 inclusive are small and are intended primarily for use on vehicles for supplying fuel to an engine. It will be understood, however, that the pumps, in these configurations, can be used for cryogenic fluids other than LNG, including other fuels such as hydrogen. It will also be understood that the pumps can also be enlarged and used in other cryogenic applications such as liquid to compressed gas fuel stations (often known as LCNG fuel stations).

In FIG. 2, pump 2 is shown driven by a linear hydraulic motor. Compared to conventional mechanically driven reciprocating pumps, which are typically driven by a crankshaft at speeds of 200 to 500 RPM, a hydraulic drive allows the pump to be driven at much lower speeds. However, conventional LNG pumps, which are typically single acting, have not been known to be effective at low speeds for applications where there is a low NPSH.

In the applicant's own experiments, pump 48 illustrated in FIG. 4 was able to empty substantially all of the liquid from the storage tank at operating speeds between 5 and 30 cycles per minute. These results show that pump 48 is able to operate with zero or very near zero NPSH. Under the tested operating conditions, pump 48 operated at between 65 and 85 percent volumetric efficiency. Accordingly, whereas conventional single acting pumps are typically most effective at high operating speeds and with a NPSH significantly higher than zero, pump 48 demonstrates that it is possible to operate a reciprocating LNG pump at much lower speeds and with a NPSH of zero or very near zero.

Another advantage of hydraulically driven reciprocating pumps, compared to crankshaft driven pumps is that the piston travel is controllable to move at substantially a constant speed throughout the piston stroke. This reduces the generation of pressure pulses in the pipe leading from the pump discharge.

As will be apparent to those skilled in the art in light of the foregoing disclosure, many alterations and modifications are possible in the practice of the present invention without departing from the scope thereof. Accordingly, the scope of the present invention is to be construed in accordance with the substance defined by the following claims.

What is claimed is:

1. A method of operating a cryogenic system for pumping a cryogenic fluid and controlling mass flow rate, said system comprising a pump operable to pump cryogenic liquid or a mixture of cryogenic liquid and vapor, whereby when said system supplies said cryogenic vapor and/or liquid to said pump from a storage tank, said method comprising:
   (a) selecting a first operating mode in which said cryogenic liquid is supplied to said pump to substantially fill a compression chamber with liquid to achieve a high mass flow rate; and
   (b) selecting a second operating mode to achieve a mass flow rate lower than said first operating mode by selectively supplying said liquid and said vapor simultaneously to said pump wherein the vapor fraction is higher for said second operating mode compared to the vapor fraction for said first operating mode; and
   (c) condensing said vapor in an inducer before directing it to said compression chamber and when said compression chamber is filled with said liquid, holding excess amounts of said fluid within said inducer.

2. The method of claim 1 wherein said method is employed to pump a fuel to an engine.

3. The method of claim 1 further comprising inducing said fluid into said pump through an inlet associated with a first end of said pump, and discharging said fluid from said pump through an outlet associated with a second end, which is opposite to said first end.

4. The method of claim 1 wherein when said second operating mode is selected, the vapor fraction that is supplied to said pump is maintained below a predetermined maximum vapor fraction by restricting the flow of vapor through a conduit between said tank and said pump.

5. The method of claim 4 wherein said system comprises an orifice for restricting the flow rate of vapor through said conduit between said tank and said pump.

6. The method of claim 4 wherein said system comprises a metering valve for controlling the flow rate of vapor through a conduit between said tank and said pump.

7. The method of claim 6, further comprising:
   programming an electronic controller that is operable to change the setting of said metering valve to control the amount of vapor that flows through said conduit in response to measured operating conditions.

8. The method of claim 7 wherein said measured operating conditions comprise fluid pressure downstream from said pump.

9. The method of claim 1 wherein, when said first operating mode is selected, said method further comprises:
   closing a valve to prevent vapor from being supplied to said pump from an ullage space of said storage tank.

10. The method of claim 1, further comprising:
    operating said pump at substantially a constant speed by employing a linear hydraulic motor.

11. The method of claim 10 wherein said pump is operable at speeds between 5 and 30 cycles per minute.

12. The method of claim 1 further comprising a cooling procedure for preparing said pump for operation, said procedure comprising:
    (a) introducing cryogenic liquid from said tank into said pump;
    (b) returning vapor created within said pump to said tank, thereby increasing pressure within said tank; and
    (c) employing the increased pressure within said tank to force more cryogenic liquid from said tank into said pump.

13. The method of claim 12, further comprising:
    (c) preventing vapor from returning to said tank when said pump has been cooled to a predetermined cryogenic operating temperature at which temperature said pump is operable to pump said cryogenic liquid and vapor in one of said first or second operating modes.

14. A method of operating a cryogenic system for pumping a fuel to an engine and controlling mass flow rate, said system comprising a pump operable to pump said fuel, which comprises a cryogenic liquid or a mixture of said cryogenic liquid and vapor, whereby when said system supplies said vapor and/or cryogenic liquid to said pump from a storage tank, said method comprising:
    (a) selecting a first operating mode in which said cryogenic liquid is supplied to said pump to substantially fill a compression chamber with liquid to achieve a high mass flow rate;
    (b) selecting a second operating mode to achieve a mass flow rate lower than said first operating mode by selectively supplying said liquid and said vapor simultaneously to said pump wherein the vapor fraction is higher for said second operating mode compared to the vapor fraction for said first operating mode; and
    (c) providing a steady supply of high pressure fuel to said engine by delivering said fuel from said pump to an accumulator vessel and selecting said operating mode to control mass flow rate to maintain pressure within a predetermined range within said accumulator vessel.

15. The method of claim 14 wherein, when pressure within said accumulator vessel is within said predetermined range, said system is controllable to increase the vapor fraction supplied to said pump when vapor pressure within said storage tank is higher than a predetermined value.

16. The method of claim 14 further comprising inducing said fluid into said pump through an inlet associated with a first end of said pump, and discharging said fluid from said pump through an outlet associated with a second end, which is opposite to said first end.

17. The method of claim 14 wherein when said second operating mode is selected, the vapor fraction that is supplied to said pump is maintained below a predetermined maximum vapor fraction by restricting the flow of vapor through a conduit between said tank and said pump.

18. The method of claim 17 wherein said system comprises an orifice for restricting the flow rate of vapor through said conduit between said tank and said pump.

19. The method of claim 17 wherein said system comprises a metering valve for controlling the flow rate of vapor through a conduit between said tank and said pump.

20. The method of claim 19, further comprising:
    programming an electronic controller that is operable to change the setting of said metering valve to control the amount of vapor that flows through said conduit in response to measured operating conditions.

21. The method of claim 20 wherein said measured operating conditions comprise fluid pressure downstream from said pump.

22. The method of claim 14 wherein, when said first operating mode is selected, said method further comprises:
    closing a valve to prevent vapor from being supplied to said pump from an ullage space of said storage tank.

23. The method of claim 14, further comprising:
    operating said pump at substantially a constant speed by employing a linear hydraulic motor.

24. The method of claim 23 wherein said pump is operable at speeds between 5 and 30 cycles per minute.

25. A method of operating a cryogenic system for pumping a cryogenic fluid, said system comprising a multi-stage pump that has at least three chambers for compressing said cryogenic fluid wherein a first chamber and a second chamber each have a volume that is larger than a third chamber, said method comprising:

(a) selectively supplying a cryogenic liquid or a mixture of cryogenic liquid and vapor to said pump such that cryogenic fluid flows through an inlet into said first chamber;

(b) compressing and condensing cryogenic vapor and compressing cryogenic liquid within said first chamber and transferring cryogenic fluid from said first chamber to said second chamber;

(c) compressing cryogenic fluid within said second chamber and transferring said cryogenic fluid from said second chamber to said third chamber until said third chamber is filled, and then transferring cryogenic fluid remaining within said second chamber to said first chamber; and (d) compressing cryogenic fluid within said third chamber and discharging compressed cryogenic fluid from said third chamber through an outlet port.

26. The method of claim 25, further comprising:

(e) employing a pressure actuated relief valve for controlling the return of cryogenic fluid from said second chamber to said first chamber.

27. The method of claim 25, further comprising:

e) supplying said fluid from said pump to an accumulator and selectively introducing only cryogenic liquid to said pump when pressure within said accumulator decreases below a predetermined value.

28. The method of claim 25 wherein at least one of a gas and vapor is condensed within said first and second chambers, such that substantially all of said fluid transferred from said second chamber to said third chamber is cryogenic liquid.

29. The method of claim 25 further comprising a procedure for accelerating the cooling down of a warm cryogenic pump, said procedure comprising:

(a) supplying cryogenic liquid from a storage tank to said pump;

(b) directing vapor created within said pump to a vapor space of said storage tank thereby increasing the pressure within said storage tank; and (c) cooling said pump by employing the increased pressure within said storage tank to deliver more cryogenic liquid from said storage tank into said pump.

30. The method of claim 29 wherein said pump is locatable external to said storage tank.

31. A method of operating a reciprocating pump for pumping a fluid from a cryogenic storage tank, said pump comprising at least three chambers for compressing said fluid, said chambers divided by a reciprocating piston assembly and said method comprising:

(a) during a retraction stroke, retracting a piston, and thereby,
increasing the volume of a first chamber of said pump and selectively introducing into said first chamber, a cryogenic liquid or a mixture of cryogenic vapor and liquid supplied from said storage tank;
decreasing the volume of a second chamber of said pump, compressing cryogenic fluid within said second chamber, transferring cryogenic fluid from said second chamber into a third chamber until said third chamber is filled, and then returning cryogenic fluid from said second chamber to said first chamber until said retraction stroke is completed;
increasing the volume of a third chamber of said pump and receiving cryogenic fluid from said second chamber into said third chamber until said third chamber is full; and (b) during an extension stroke, extending said piston, and thereby,
decreasing the volume of said first chamber, compressing cryogenic fluid within said first chamber, and transferring cryogenic fluid within said first chamber to said second chamber;
increasing the volume of said second chamber and drawing fluid into said second chamber from said first chamber;
decreasing the volume of said third chamber, compressing fluid within said third chamber, and ejecting cryogenic fluid through an outlet from said third chamber.

32. The method of claim 31 wherein, at the end of said extension stroke, the volume of said second chamber is between about four and ten times larger than the volume of said third chamber when said piston is at the end of said retraction stroke.

33. The method of claim 32 wherein the volume of said first chamber at the end of said retraction stroke is substantially equal to the volume of said second chamber at the end of said extension stroke.

34. The method of claim 31 wherein at the end of said extension stroke, the volume of said third chamber is substantially zero.

35. A method of operating a reciprocating pump for pumping a cryogenic fluid from a sump of a cryogenic storage tank, said pump comprising at least two chambers divided by a reciprocating piston assembly, said method comprising:

(a) during a retraction stroke,
increasing the volume of a first compression chamber of said pump and introducing into said first compression chamber a cryogenic fluid supplied from said storage tank;
decreasing the volume of a second compression chamber of said pump and thereby compressing fluid within said second compression chamber and ejecting compressed fluid from said second compression chamber and out of said pump; and (b) during an extension stroke,
decreasing the volume of said first compression chamber and transferring fluid within said first compression chamber to said second compression chamber;
increasing the volume of said second compression chamber and drawing cryogenic fluid into said second compression chamber from said first compression chamber, wherein the volume of said second compression chamber at the end of said extension stroke is less than the volume of said first compression chamber at the end of said retraction stroke so that when the volume of said second compression chamber is filled by fluid flowing into said second compression chamber from said first compression chamber, to accommodate the transfer into said second chamber of fluid remaining within said first chamber, compressed cryogenic fluid is ejected from said second compression chamber and out of said pump.

36. The method of claim 35 wherein the volume of said second compression chamber at the end of said extension stroke is less than or equal to about half of the volume of said first compression chamber at the end of said retraction stroke.

37. The method of claim 35 wherein the relative sizes of said first and second chambers are such that about an equal amount of fluid is discharged during said retraction and extension strokes.

38. The method of claim 35 further comprising condensing cryogenic vapor in an inducer stage prior to introducing said cryogenic fluid into said first compression chamber.

* * * * *